United States Patent
Trevathan

(10) Patent No.: US 7,085,891 B2
(45) Date of Patent: Aug. 1, 2006

(54) METHOD FOR MANAGING A CACHE MEMORY USING A PREDICTIVE MODELING ENGINE TO SELECT A CACHING ALGORITHM

(75) Inventor: Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 09/826,085

(22) Filed: Apr. 4, 2001

(65) Prior Publication Data

US 2002/0147888 A1    Oct. 10, 2002

(51) Int. Cl.
*G06F 12/00* (2006.01)
(52) U.S. Cl. .................................................. 711/133
(58) Field of Classification Search ......... 711/133–136
See application file for complete search history.

(56) References Cited

U.S. PATENT DOCUMENTS

| | | | |
|---|---|---|---|
| 5,043,885 A | 8/1991 | Robinson | 711/133 |
| 5,497,477 A | 3/1996 | Trull | 711/133 |
| 5,727,129 A | 3/1998 | Barrett et al. | 706/10 |
| 5,873,100 A | 2/1999 | Adams et al. | 707/204 |
| 5,881,231 A | 3/1999 | Takagi et al. | 709/212 |
| 5,915,262 A * | 6/1999 | Bridgers et al. | 711/147 |
| 6,006,033 A | 12/1999 | Heisch | 717/158 |
| 6,125,394 A | 9/2000 | Rabinovich | 709/226 |
| 6,128,701 A | 10/2000 | Malcolm et al. | 711/133 |
| 6,163,773 A | 12/2000 | Kishi | 706/16 |
| 6,223,256 B1 * | 4/2001 | Gaither | 711/134 |
| 6,266,742 B1 * | 7/2001 | Challenger et al. | 711/133 |
| 6,272,598 B1 * | 8/2001 | Arlitt et al. | 711/133 |
| 6,526,479 B1 * | 2/2003 | Rosenzweig | 711/133 |

FOREIGN PATENT DOCUMENTS

| | | |
|---|---|---|
| EP | 0354579 A2 * | 2/1990 |
| JP | 2050236 | 2/1990 |
| JP | 11053244 A | 2/1999 |

OTHER PUBLICATIONS

LSAM Configurable Cache Replacement Policies, [Online] http://www.isi.edu/Isam/proxy/0.71/README.Isam-caching, 1998.*
LSAM Dynamic Cache Control, [Online] http://www.isi.edu/Isam/dynamic-cache/, 1998.*
Serpanos et al. Caching Web Objects using Zipf's Law. Multimedia Storage and Archiving Systems III, Proceedings of SPIE (Conference), Boston, Nov. 2-4, 1998 Proceedings of SPIE, vol. 3527, pp. 320-326.*

(Continued)

*Primary Examiner*—Woo H. Choi
(74) *Attorney, Agent, or Firm*—Schmeiser, Olsen & Watts; David R. Irvin

(57) ABSTRACT

A caching system includes a caching profile that records a file identifier and an entry time for each file that enters the caching system, and a predictive modeling engine that analyzes the profile to determine metrics for members of a set of caching algorithms. The metrics may be measures of clustering or scattering of the file identities entering the caching system. The algorithm with the most favorable metric is selected as the preferred caching algorithm, and the file is processed according to the preferred algorithm. In one embodiment of the invention, the set of caching algorithms includes a most-used caching algorithm, a least-used caching algorithm, a most-recently-used caching algorithm, and a least-recently-used caching algorithm.

7 Claims, 4 Drawing Sheets

OTHER PUBLICATIONS

Reedy, M. et al. "Epx1: a Comparison Between a Simple Adaptive Caching Agent Using Document Life Histories and Existing Cache Techniques", Computer Networks and ISDN Systems, vol. 30, Nos. 22-23, pp. 2149-2153, Nov. 25, 1998.

Serpanos, D. N. et al. "Caching Web Objects Using Zipf's Law", Multimedia Storage and Archiving Systems III, Proceedings of SPIE (Conference), Boston, Nov. 2-4, 1998 Proceedings of SPIE, vol. 3527, pp. 320-326.

Zhong, Su et al. "WhatNext: A Prediction System for Web Requests Using N-Gram Sequence Models" International Conference on Web Information Systems Engineering, Hong Kong, vol. 1, pp. 214-221, Jun. 19-21, 2000 Proceedings.

Laird, P. et al. "Discrete sequence Prediction and its Application", Machine Learning, vol. 15 issue: 1, pp. 43-68, Apr. 1994.

* cited by examiner

FIG. 2

| File Identifiers | Timestamps |
|---|---|
| File A | Time 1 |
| File B | Time 2 |
| . . . | . . . |
| File N | Time N |

METHOD FOR MANAGING A CACHE MEMORY USING A PREDICTIVE MODELING ENGINE TO SELECT A CACHING ALGORITHM

FIELD OF THE INVENTION

The invention relates generally to computer memory management, and more particularly to an improved method for managing a cache memory.

BACKGROUND

A computer system's responsiveness is constrained in three ways: by processor limitations, by communication limitations, and by memory limitations. Processor limitations have given way in accord with Moore's law, which holds that processor capability doubles every eighteen months. Communication limitations have given way in accord with recent increases in bandwidth provided by fiber optics and by advanced wireline techniques such as Asymmetric Digital Subscriber Loops.

Memory limitations, however, continue to be problematic. In practice, computer memory is often a mixed technology, with both solid-state and electromechanical aspects. Although the performance of solid-state memory has increased dramatically, its cost remains high relative to the need for such memory that has been created by the demands of the information age. Consequently, much computer memory continues to use electromechanical technology such as disk drives of various kinds.

Although such electromechanical technology offers vast storage capacity, its performance is not responsive. In turn the performance of a computer when used in an application such as Internet research may be limited by the time needed to read to and write from its large but slow electromechanical memory.

A longstanding solution to this problem is to use relatively slow memory for storing information whose recall does not directly limit the computer's responsiveness, and to use relatively fast memory for storing information that must be retrieved without perceptible delay. This principle is often carried one step further by dividing the fast memory itself into cache memory, which employs extraordinarily fast but expensive memory chips, and main memory, which uses somewhat slower but less expensive chips.

Because of the fast technology employed by the cache is expensive, the size of the cache must be limited. Consequently, in order to maximize the responsiveness of a computer system, the cache must be managed as efficiently as possible. Managing the cache efficiently is the purpose of a caching algorithm, which decides what information to add to the cache, what information to delete from the cache, and what information to keep in the main memory rather than in the cache.

One such algorithm is called the most-used caching algorithm. A most-used caching algorithm keeps information in the cache that has been used most often in the past, under the presumption that the information that has been used most often in the past will probably be the information that is needed next. Another such algorithm is the most-recently-used caching algorithm, which keeps information most recently used in the cache, under the presumption that the most recently used information will probably be the information that is needed next.

Unfortunately, these and other such caching algorithms are compromises that have significant limitations. For example, a most-used caching algorithm may be unreceptive to the need to cache new information when an Internet user's behavior changes. On the other hand, a most-recently-used algorithm may be too receptive to an Internet user's tangential excursions, and may suffer by discarding information needed long-term in favor of information used only once.

Thus, in view of the shortcomings of known caching algorithms, and in view of the importance of efficient cache management given the demands of the Internet and information age, there remains a need for a way of managing cache memory that draws upon the advantages of each of the various kinds of caching algorithms and yet minimizes their shortcomings.

SUMMARY OF THE INVENTION

In response to the foregoing need, the present invention provides an improved way of managing a cache that draws upon the strengths of various caching algorithms and yet minimizes the shortcomings that accompany each. When a file enters the caching system, its identifier and time of entry are recorded in a caching profile. A predictive modeling engine examines the caching profile, and computes metrics or figures of merit for the members of a set of caching algorithms. The caching algorithm with the most favorable figure of merit is selected as the preferred caching algorithm, and the entering file is managed according to that algorithm. In one embodiment of the invention, the set of caching algorithms includes a most-used caching algorithm, a least-used caching algorithm, a most-recently-used caching algorithm, and a least-recently-used caching algorithm. The figures of merit or metrics for the caching algorithms may be measures of the clustering or the scattering of the identities of the files entering the caching system.

These and other aspects of the present invention will be more fully appreciated when considered in the light of the following drawings and detailed description.

BRIEF DESCRIPTION OF THE DRAWINGS

FIG. 2 shows an exemplary structure of the caching profile of FIG. 1.

DETAILED DESCRIPTION OF THE INVENTION

Figure 1:
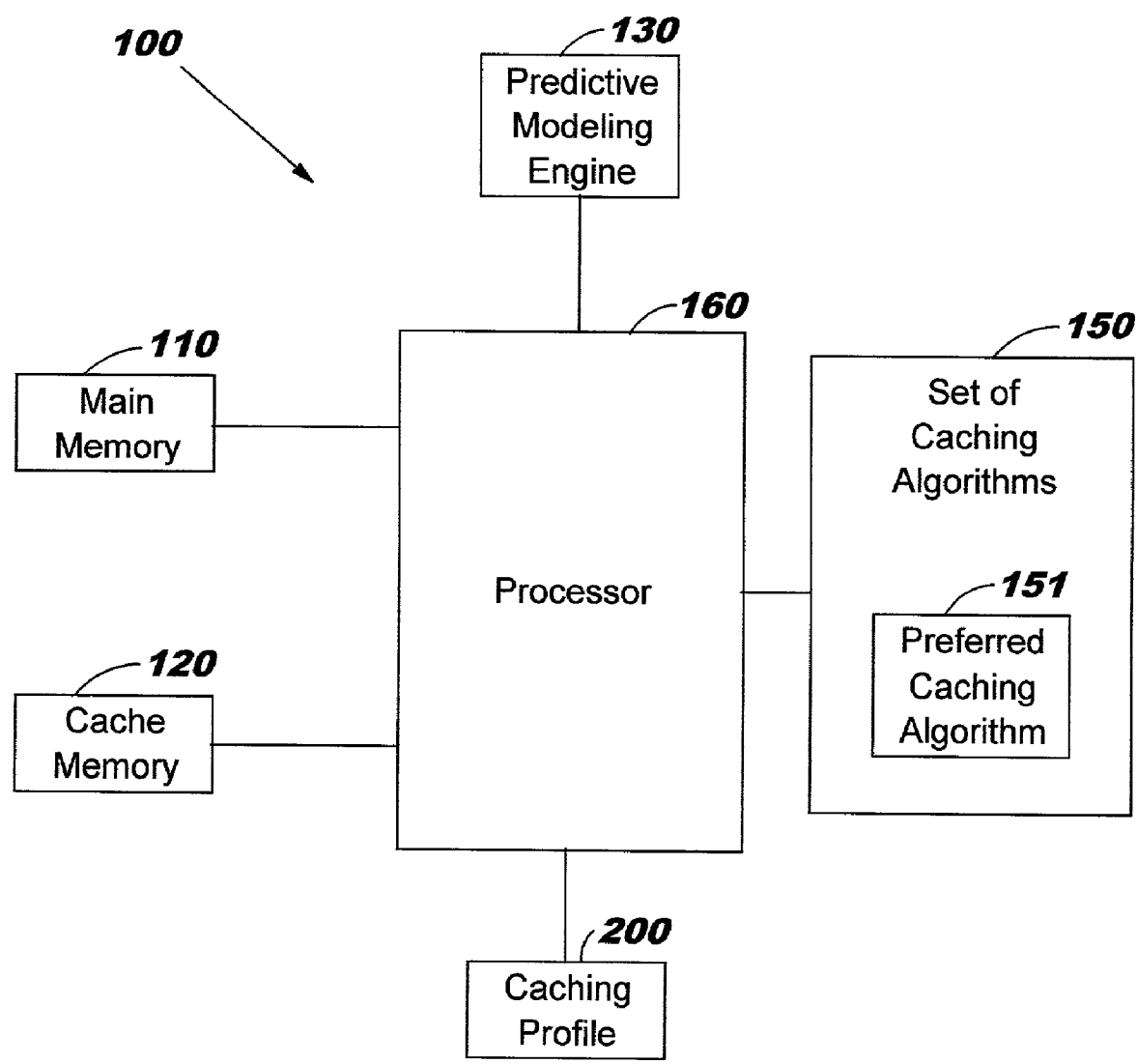
FIG. 1 shows a caching system that includes a caching profile.

In FIG. 1, a caching system 100 includes a processor 160 which coordinates a main memory 110, a high-speed cache 120, a predictive modeling engine 130, a caching profile 200, a set of caching algorithms 150, and a preferred caching algorithm 151 selected from the set of caching algorithms 150. Although FIG. 1 shows the aforementioned elements as separate, these elements may be combined. For example, the cache 120 may be included in the processor 160, the predictive modeling engine 130 may be code executed by the processor 160, the caching profile 200 may be part of the cache 120 or part of the main memory 110, the caching algorithms 150 may be code executed by the processor 160, and so forth. Thus, the particular configuration of FIG. 1 is shown for clarity of illustration rather than limitation.

FIG. 2 shows an exemplary structure of the caching profile 200. When an information file enters the caching system 100 for consideration, the caching profile 200 records a file identifier 210 and a current timestamp 220 associated with the file. The exemplary caching profile 200 of FIG. 2 includes several file identifiers 210A through 210N and their associated timestamps 220A through 220N.

Figure 3:
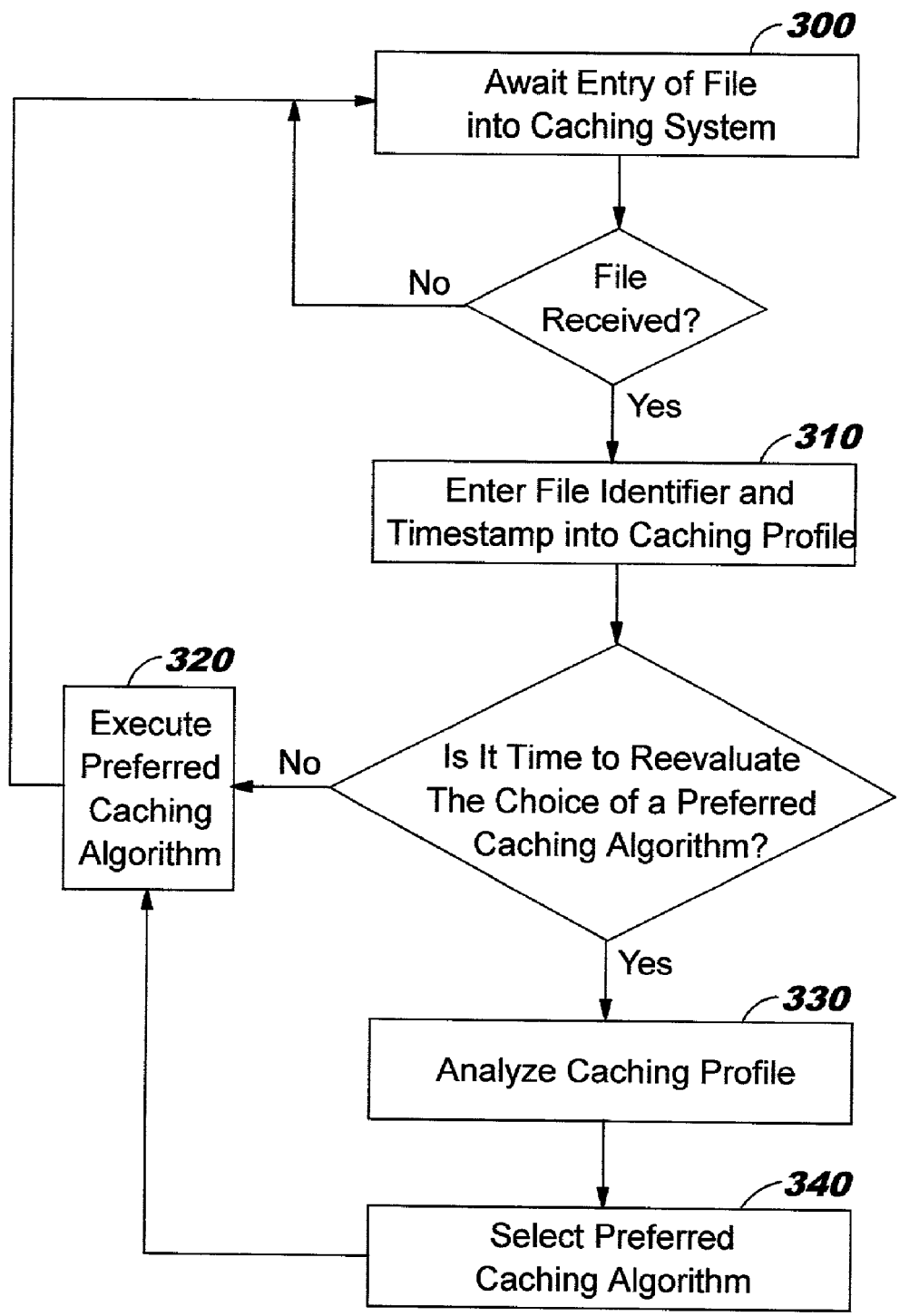
FIG. 3 shows aspects of the operation of the caching system of FIG. 1.

FIG. 3 shows aspects of the operation of the caching system 100. The caching system 100 awaits entry of a file. Pending an arrival, the caching system 100 continues to wait (step 300). Upon arrival of a file, the caching profile 200 is updated accordingly by entering the file's identifier 210 and a timestamp 220 (step 310).

As described below, the present invention provides for selecting a preferred caching algorithm 151 chosen from the set of caching algorithms 150. The choice of the preferred caching algorithm 151 may be re-evaluated upon the entry of each new file into the caching system 100, or re-evaluated algorithmically (for example, upon the entry of every tenth file into the caching system 100) or re-evaluated in response to human input.

When it is not time to re-evaluate the choice of the preferred caching algorithm 151, the preferred caching algorithm 151 then-of-record is executed, and the file entering the caching system 100 is processed accordingly (step 320). The caching system 100 then awaits a new file (step 300).

Otherwise (i.e., it is time to re-evaluate the choice of the preferred caching algorithm 151), the predictive modeling engine 130 analyses the caching profile 200 (step 330), as described below. Responsive to the outcome of the analysis, the predictive modeling engine 130 selects a preferred caching algorithm 151 from among the set of caching algorithms 150 (step 340). The newly selected preferred caching algorithm 151 is then executed, and the file is processed accordingly (step 320). The caching system 100 then awaits the arrival of a new file (step 300).

In one embodiment of the present invention, the set of caching algorithms 150 includes a most-used caching algorithm, a least-used caching algorithm, a most-recently-used caching algorithm, and a least-recently-used caching algorithm. Because the operation of each of these algorithms is well known to those skilled in the art, they will not be described further here. It is important to note, however, that these particular caching algorithms are mentioned here only clarify the description below, and that the present invention is not limited to the use of any of the four caching algorithms. Rather, in the present invention any caching algorithm may be included in the set of caching algorithms 150.

Figure 4:
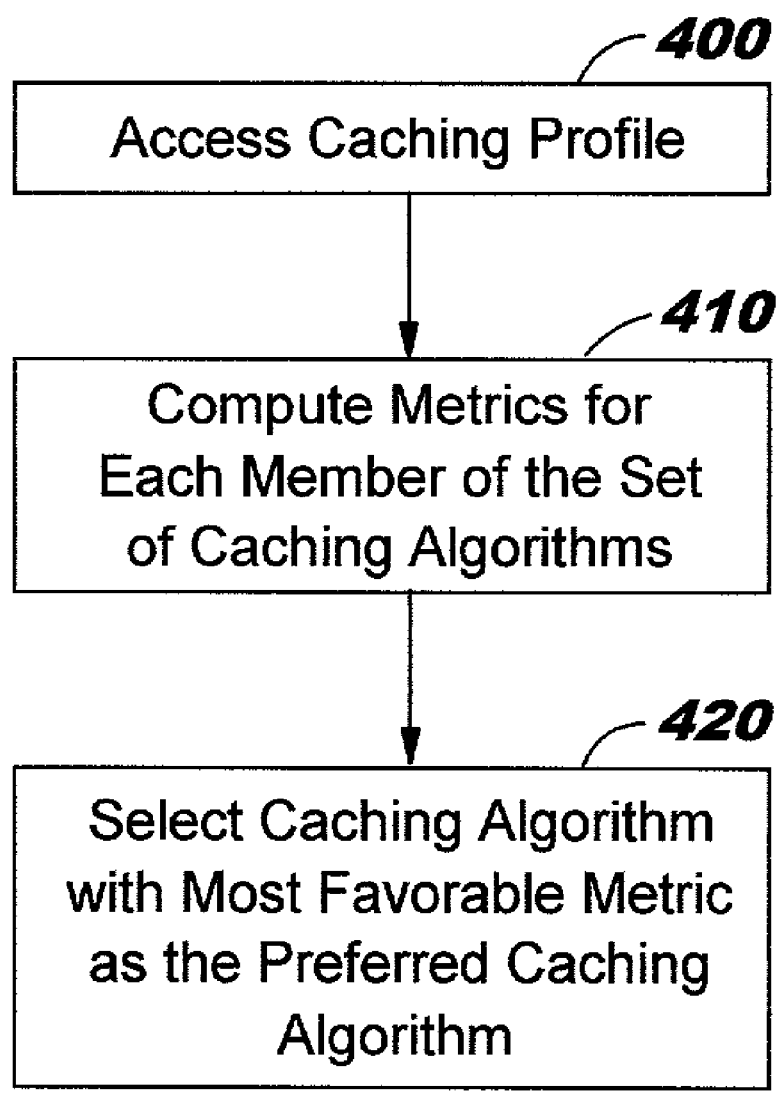
FIG. 4 shows aspects of the selection of a preferred caching algorithm for the caching system that is shown in FIG. 1.

As mentioned above, the predictive modeling engine 130 analyses the caching profile 200 (step 330), and, responsive to the outcome of the analysis, selects a preferred caching algorithm 151 from among the set of caching algorithms 150 (step 340). FIG. 4 shows an exemplary way in which this may be done. The predictive modeling engine 130 accesses the caching profile 200 (step 400). For each member of the set of caching algorithms 150, the predictive modeling engine 130 computes a metric using data from the caching profile 200 (step 410). The metric computed for each caching algorithm is a figure of merit that suggests how effective the caching algorithm would be if it were applied to the present caching situation.

The predictive modeling engine 130 then analyzes the metrics by comparing them one to another, for example by finding the highest numerical value among the metrics, and responsive to the outcome of this analysis selects one of the algorithms of the set of caching algorithms 150 as the preferred caching algorithm 151 (step 420).

As mentioned above, in one embodiment of the present invention the set of caching algorithms 150 includes a most-used caching algorithm, a least-used caching algorithm, a most-recently-used caching algorithm, and a least-frequently-used caching algorithm. The predictive modeling engine 130 may analyze the caching profile 200 by computing metrics for these four caching algorithms as shown in the following example. In this example, S1 is the metric of the most-used caching algorithm, S2 is the metric of the least-used caching algorithm, S3 is the metric of the most-recently-used caching algorithm, and S4 is the metric of the least-recently-used caching algorithm.

Let N be the number of entries in the caching profile 200, and let Ni be the number of times file identifier i appears in the caching profile 200. Let Ri be the relative frequency of occurrence of each file identifier, i.e., $Ri=Ni/N$. Figures of merit S1 and S2 are determined as follows: S1 is the number of file identifiers which appear more than once in the caching profile 200 for which Ri is greater than a predetermined threshold, and S2 is the number of file identifiers which appear more than once in the caching profile 200 for which Ri is less than or equal to the predetermined threshold. In one embodiment of the invention, the predetermined threshold is 0.25.

Suppose that file alpha appears five times in the caching profile 200, file beta appears three times, file gamma appears twice, and files delta and epsilon each appear once. Here, $N=12$, $N1=5$, $N2=3$, $N3=2$, $N4=1$, and $N5=1$. The frequencies of occurrence are $R1=5/12$, $R2=3/12$, $R3=2/12$, $R4=1/12$, and $R5=1/12$. The figures of merit are $S1=1$ (one identifier, alpha, has relative frequency R1 greater than 0.25), and $S2=2$ (two identifiers, beta and gamma, have relative frequencies less than or equal to 0.25, and two identifiers, delta and epsilon, each appear only once and are therefore not included when computing the figures of merit).

To find S3 and S4, the most-recently-used and least-recently-used figures of merit, respectively, measures are taken of the distances in the caching profile 200 between entries of each of the distinct file identifiers. Each occurrence of a distance that is less than or equal to a second predetermined threshold is counted toward S3, and each occurrence of a measure that is greater than the second predetermined threshold is counted toward S4. Again, if a file is accessed only once, it is not counted in the computation of either figure of merit. In one embodiment, the second predetermined threshold is the number of unique file identifiers, divided by two, and rounded down to an integer. In the example given above, the second threshold would be two (there are five unique identifiers, which are alpha, beta, gamma, delta, and epsilon).

Continuing with the example, suppose that the order of arrival of the twelve files in the caching database is as follows: alpha, alpha, beta, gamma, delta, alpha, beta, beta, gamma, epsilon, alpha, alpha. There are three occurrences of the measure 1 (from the first alpha to the second alpha, from the second beta to the third beta, and from the fourth alpha to the fifth alpha), no occurrences of the measure 2, no occurrences of measure 3, two occurrences of measure 4 (from the second alpha to the third alpha, and from the first beta to the second beta), and two occurrences of the measure 5 (from the third alpha to the fourth alpha, and from first gamma to the second gamma). Thus there are three occurrences of measures that are less than or equal to two, and four occurrences of measures that are greater than two—hence, $S3=3$ and $S4=4$.

We now have four metrics or figures of merit: $S1=1$ for the most-used caching algorithm, $S2=2$ for the least-used caching algorithm, S3=3 for the most-recently-used caching algorithm, and S4=4 for the least-recently-used caching algorithm. The highest metric or figure of merit is S4=4; therefore, the least-recently-used caching algorithm is selected as the preferred caching algorithm.

In the foregoing example, the values of the metrics and the selection of the least-recently-used caching algorithm correspond intuitively to a fragmented pattern of file use, such as the deliberately fragmented hypothetical pattern from which these values were just derived. More generally, the figures of merit or metrics used in the foregoing example may be thought of as measures of clustering. S1 measures most-used activity, i.e., clustering; whereas S2 measures scattering, or absence of clustering. Likewise, for S3 and S4, respectively, but with reference to recency of use. Once having been taught this principle, those skilled in the art will understand that other measures of clustering and scattering may be used as well as the illustrative metrics described above in detail, and that the present invention encompasses a wide variety of other metrics, including but not limited to those which relate to clustering and scattering.

The foregoing example shows how the present invention may select a caching algorithm other than the commonplace most-used caching algorithm when circumstances make the choice of such an alternate desirable. Further, from the foregoing examples and description those skilled in the art will recognize that the present invention provides an improved way of managing a cache. The improved way of managing a cache is more versatile that previously known methods and offers better performance. The foregoing description is illustrative, however, rather than limiting, and the scope of the present invention is limited only by the claims that follow.

I claim:

1. A method for managing a cache, comprising the acts of:
    updating a caching profile in response to arrival of a file at the cache;
    responsive to the act of updating, analyzing information stored in the caching profile; and
    responsive to the act of analyzing, selecting a preferred caching algorithm from a plurality of caching algorithm.

2. The method of claim 1, wherein the act of analyzing is performed by a predictive modeling engine.

3. A method for managing a cache, comprising the acts of:
    responsive to arrival of a file at the cache, analyzing information stored in a caching profile by computing a plurality of metrics; and
    responsive to a comparison of the metrics one with another, selecting a preferred caching algorithm from a plurality of caching algorithms.

4. The method of claim 3, wherein the plurality of metrics includes clustering metrics.

5. The method of claim 3, wherein the plurality of metrics includes scattering metrics.

6. The method of claim 3, wherein the plurality of caching algorithms includes a least-used caching algorithm, a most-used caching algorithm, a least-recently-used caching algorithm, and a most-recently-used caching algorithm.

7. The method of claim 3, wherein the act of analyzing is performed by a predictive modeling engine.

* * * * *